(12) United States Patent
Eisenach

(10) Patent No.: US 8,096,561 B2
(45) Date of Patent: Jan. 17, 2012

(54) FLANGE GASKET

(75) Inventor: Frank-Peter Eisenach, Wermelskirchen (DE)

(73) Assignee: Klinger AG, Zug (CH)

( * ) Notice: Subject to any disclaimer, the term of this patent is extended or adjusted under 35 U.S.C. 154(b) by 403 days.

(21) Appl. No.: 12/397,157

(22) Filed: Mar. 3, 2009

(65) Prior Publication Data

US 2009/0243231 A1 Oct. 1, 2009

(30) Foreign Application Priority Data

Mar. 26, 2008 (EP) .................................... 08005643

(51) Int. Cl.
*F16L 19/065* (2006.01)
*F16L 23/18* (2006.01)

(52) U.S. Cl. ......... 277/609; 277/616; 277/644; 277/651

(58) Field of Classification Search .................. 277/651, 277/191, 179, 925, 644, 639, 653, 606, 608, 277/609, 611, 616, 650
See application file for complete search history.

(56) References Cited

U.S. PATENT DOCUMENTS

| | | | | |
|---|---|---|---|---|
| 922,130 | A | * | 5/1909 | Goetze ........................... 277/612 |
| 2,573,225 | A | * | 10/1951 | Mervyn ........................ 277/437 |
| 3,445,120 | A | * | 5/1969 | Barr ............................. 277/625 |
| 3,603,602 | A | * | 9/1971 | Padula .......................... 277/554 |
| 7,455,301 | B2 | * | 11/2008 | Ragsdale et al. ............. 277/627 |

FOREIGN PATENT DOCUMENTS

| | | | |
|---|---|---|---|
| DE | 22801351 U1 | | 4/1999 |
| DE | 202005004967 | * | 12/2005 |
| EP | 1707862 A | | 10/2006 |
| GB | 816559 A | | 7/1959 |

OTHER PUBLICATIONS press release, Klinger News, Dec. 2005, Klinger Administration AG, pp. 5/12.*

* cited by examiner

*Primary Examiner* — Thomas Beach
*Assistant Examiner* — Kelly Shaw
(74) *Attorney, Agent, or Firm* — Kilpatrick Townsend & Stockton LLP

(57) ABSTRACT

Ring-shaped flange gasket produced from a rubbery-elastic material, said flange gasket comprising two rings (2, 3), each having a ring-shaped reinforcing insert (9, 10), said rings being formed in a wedge-shaped manner transversely relative to the ring axis (4) and, at sides (5, 6) that face each other, adjoining one another at right angles to the ring axis (4) by means of planar surfaces and there being in engagement with one another so as to be rotatable, wherein along at least one circumferential section, the ring-shaped reinforcing insert (9, 10) has a wave profile (11) with an increasing wave height in a region of increasing wedge height.

12 Claims, 3 Drawing Sheets

FLANGE GASKET

Figure 1:
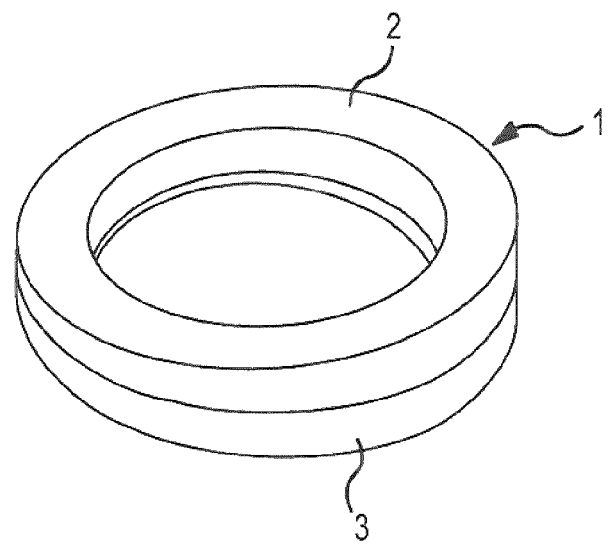

The invention relates to a flange gasket.

EP 1 707 862 A1 discloses a flange seal of this type that comprises two rings produced from a rubbery-elastic material and formed in a wedge-shaped manner transversely relative to the ring axis. Simply by rotating the two rings in opposite directions, the position of the same, one relative to the other, can be continuously adjusted between a position at an angle of expansion of 0° and a position at a maximum angle of expansion. Alignment errors with flange misalignment can be compensated for in this manner by sealing using the gasket. To improve the robustness of the flange gasket in terms of preventing it from being pressed out of the sealing gap when it is mounted, the two rings are provided with metal reinforcing inserts, which can be in the form of steel ring inserts or also expanded metal inserts, wire fabric inserts or similar. The steel ring inserts, in this case, extend approximately parallel to the inside or outside surfaces. The increase in robustness achieved by the reinforcing inserts, however, is in many cases not sufficient.

It is the object of the invention, consequently, to create a flange gasket, which makes it possible to compensate for alignment errors and which, at the same time, is robust.

This object is achieved through the features of claim 1.

A flange gasket is hereby achieved which integrates a three-dimensional supporting framework as a ring-shaped reinforcing insert. On account of the wave profile, the reinforcing insert has a waveform, which results in a resilient, yet for the robustness requirements of the flange gaskets, solid ring design. The three-dimensionally curved surfaces of the reinforcing inserts make the flange gasket extraordinarily compression-proof and distortion-resistant. The increase in the wave height as the wedge height increases provides the flange gasket with a type of sandwich arrangement for uniform surface stability under load.

The reinforcing insert preferably has a flatness in the region of a wedge tip of a respective ring, surface reinforcement thereby being realised in the narrowest region of the rings. In addition, the wave profile is preferably symmetrical relative to a central cross-sectional plane of the ring in order to provide the rings with a uniformly acting reinforcing insert in the wedge-shaped circumferential development.

The wave profile of the reinforcing insert is preferably adapted; to a wedge profile of the rings. The increase in the wave height of the ring-shaped reinforcing insert with a wave profile that extends in a wedge-shaped manner can be adapted to a wedge form of the rings of the flange gasket. A curve length and curve height of the wave profile can be selected in dependence on a wedge height of the rings. Harmonic waves are preferably realised with the wave crests or respectively the curve vertices orientated in a plane substantially parallel to the outer surface of a ring. The harmonic waves, in this case, preferably extend from a bottom surface, which forms flat pieces between the harmonic waves. The bottom surface is preferably positioned substantially parallel to the inner surface of a ring.

The reinforcing insert can be produced from various metal materials. Steel, aluminium, metal alloys and cast iron are especially preferred.

Additional developments of the invention can be found in the following description and the subclaims.

The invention is described in more detail below by way of the exemplary embodiment of the invention represented in the attached Figures.

Figure 2:
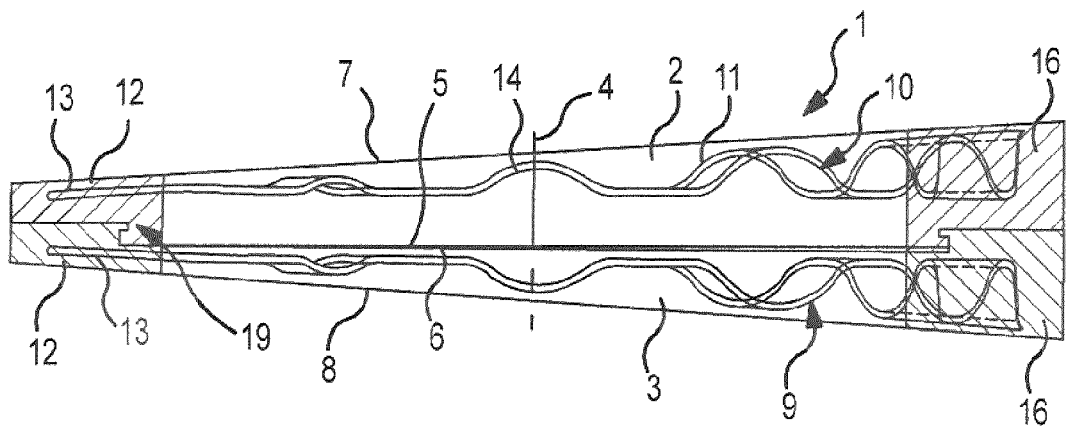
Figure 3:
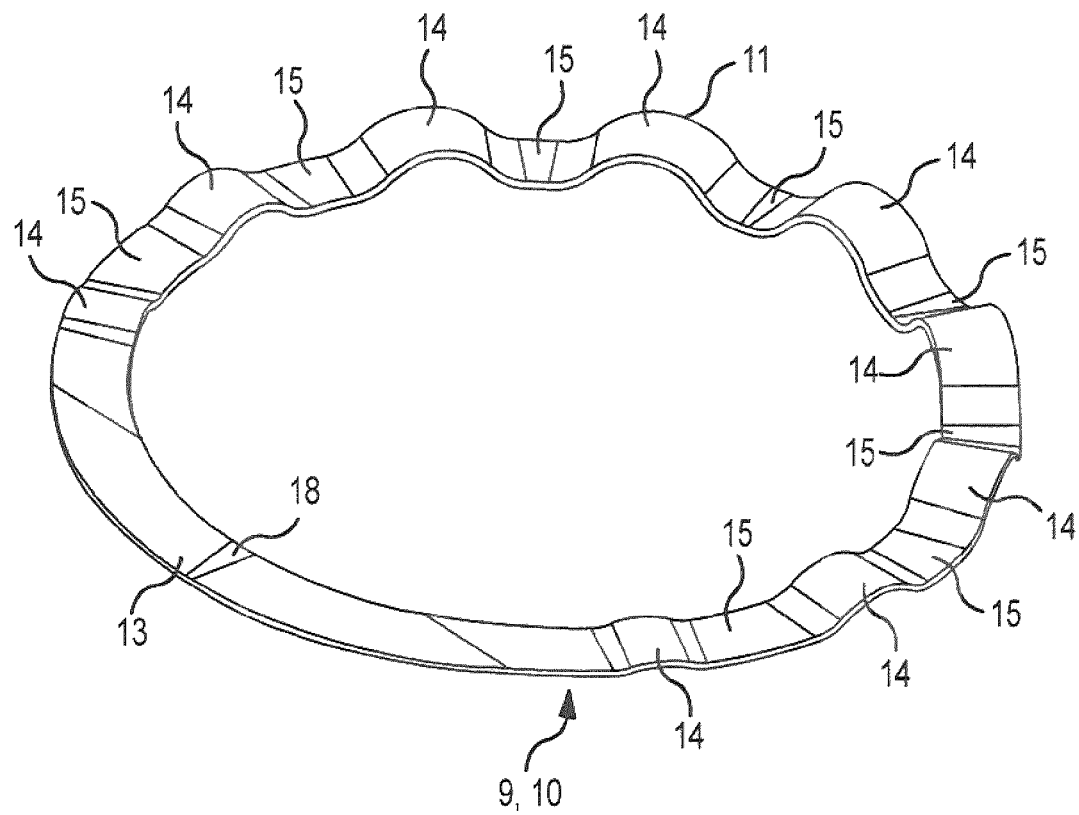
Figure 4:
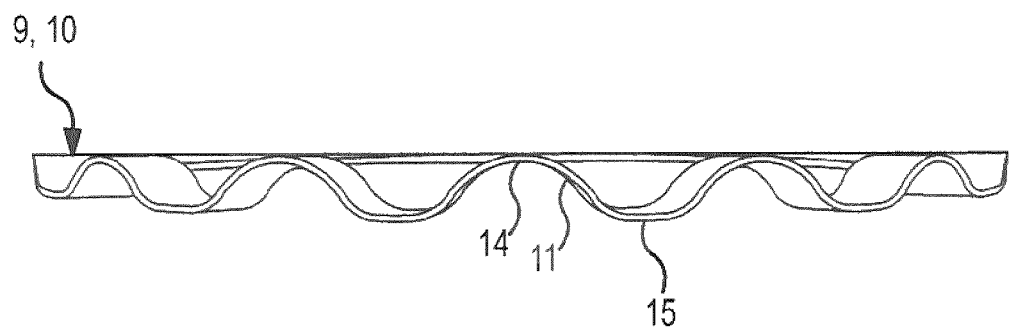
Figure 5:
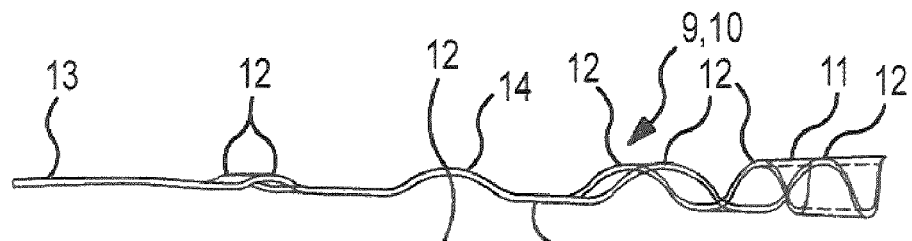
Figure 6:
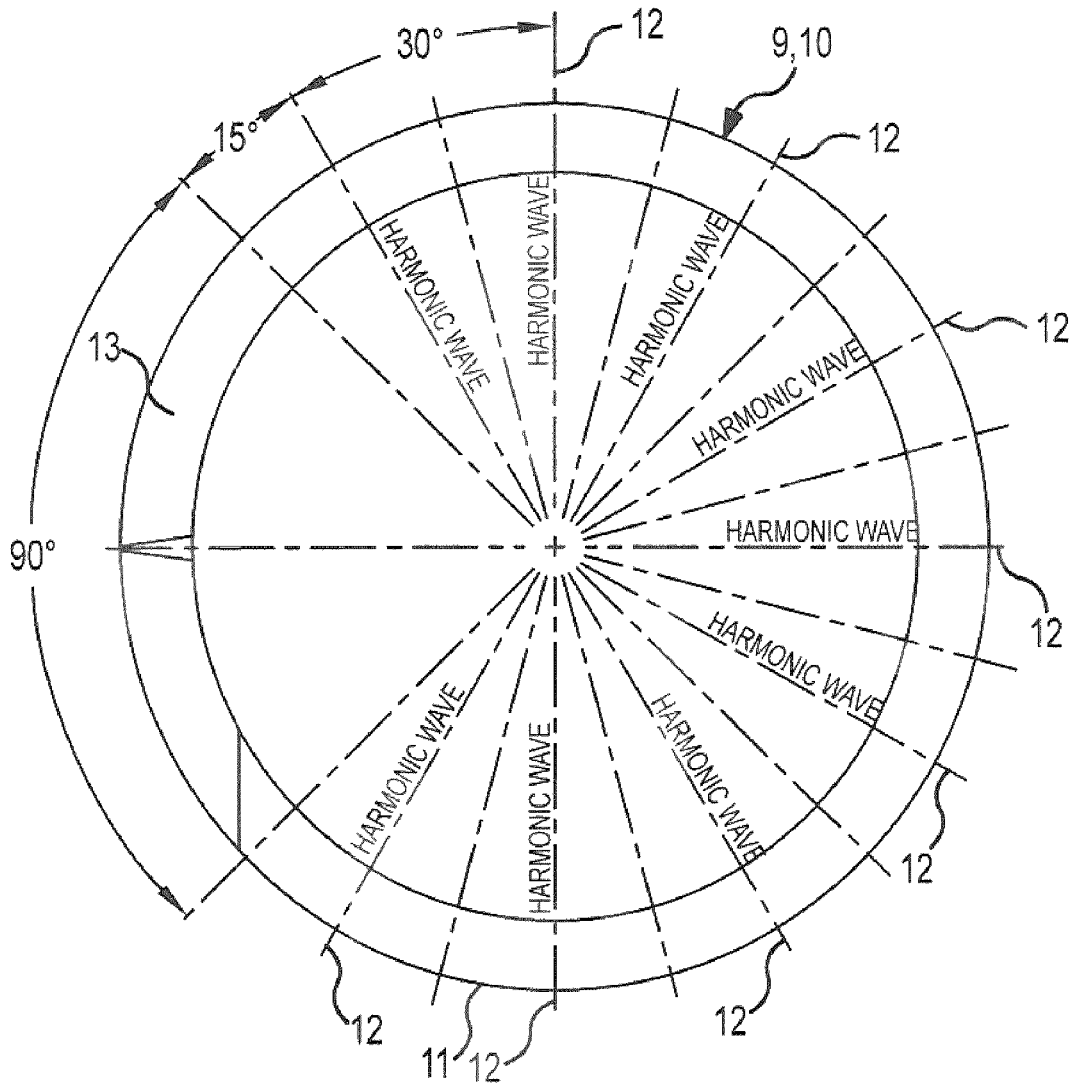

FIG. 1 shows a perspective view of a schematic representation of a ring-shaped flange gasket at a maximum angle of expansion, FIG. 2 shows a sectional schematic representation of the flange gasket according to FIG. 1, FIG. 3 shows a top view of a schematic representation of the ring-shaped reinforcing insert of the flange gasket, according to FIG. 2, FIG. 4 shows a view of a schematic representation of the ring-shaped reinforcing insert, FIG. 5 shows a schematic representation of the ring-shaped reinforcing insert according to FIG. 2, FIG. 6 shows a schematic, representation of a diagram with a distribution of harmonic waves on the reinforcing insert.

FIG. 1 and FIG. 2 show a ring-shaped flange gasket 1, which comprises two rings 2, 3 produced from a rubbery-elastic material. The rings 2, 3 are formed in a wedge-shaped manner transversely relative to the ring axis 4 and, at sides that face each other, adjoin one another at right angles to the ring axis by means of planar surfaces 5, 6 and are in engagement with one another there so as to be rotatable. The surfaces 5, 6, in this case, form inner surfaces of the rings 2, 3. The surfaces 7, 8 situated respectively opposite the said surfaces 5, 6 of a ring 2, 3 form outer surfaces of the rings 2, 3. The surfaces 5, 6 of the inner surfaces preferably extend parallel to a connecting plane of the rings 2, 3 to form the flange gasket 1, whilst the surfaces 7, 8 of the outer surfaces form wedge sides thereto.

The rings 2, 3 each have a ring-shaped reinforcing insert 9, 10, which, along at least one circumferential section in a region of increasing wedge height, has a wave profile 11 with an increasing wave height. The wave profile 11 is preferably formed in such a manner that the reinforcing insert 9, 10 has a flatness 13 in the region of a wedge tip 12 of the respective ring 2, 3, with respect to which the wave heights increase up to a maximum wave height in the region of the wedge base 16. The reinforcing insert 91, 10 is integrated into the rubbery-elastic material of the rings 2, 3, wherein a protrusion of non-reinforced rubbery-elastic material can be provided on the edge side of the rings 2, 3.

The flatness 13 extends over a circumferential section of 80 to 100° with reference to the central point of the ring. According to FIG. 6, the circumferential section is, for example, 90°. In addition, the wave profile 11 preferably extends symmetrically to a central cross-sectional plane of the ring, as is shown in FIG. 2 to FIG. 6.

The ring-shaped reinforcing insert 9, 10 preferably has a wave profile 11 with a portion of longer wave length in the region of greater wedge height and a portion of shorter wave length in the region of smaller wedge height. This means that the curves 14 of the waves of the wave profile 11 are curved to different extents. It may be added that the wave profile 11 is formed preferably only by harmonic waves, as can be seen in particular in FIG. 2 and FIG. 5. The said harmonic waves are spaced apart by flat pieces 15. The curves 14 of each of the wave crests of the harmonic waves face the outer surface 7, 8 of the ring 2, 3. The vertices 17 of the curves 14 of the harmonic waves of a ring 2, 3 are preferably in a plane parallel to the outer surface 7, 8 of the respective ring 2, 3.

The wave crests of the wave profile 11 preferably follow the increase in the wedge height in a continuous manner. The curves 14 of the wave profile 11 with the maximum wave height are then positioned in the region of the wedge base 16.

The flat pieces 15 between the curves 14 of the wave crests of the wave profile 11 are preferably in a plane parallel to the inner surface 5, 6 of the respective ring 2, 3. The flat pieces 15 are then part pieces of a level bottom surface, with respect to which the curves 14 of the wave profile 11 rise.

FIG. 6 shows the nine harmonic waves with curves 14 provided in accordance with the exemplary embodiment. The vertices 17 of the harmonic waves are disposed next to one another equally spaced apart around the circumference. For example, two vertices 17 are spaced apart respectively by 30°, with reference to the central point of the ring or respectively to the ring axis 4 of the ring-shaped reinforcing insert 9, 10. The higher and wider curves 14 of the wave crests towards the wedge bottom 16 are spaced apart by shorter flat pieces 15 than the lower and shorter curves 14 of the wave crests adjacent the flatness 13. A marking 18 can indicate the central region of the flatness 13. The number of harmonic waves of the wave profile 11 is selectable and is determined in particular by the diameter of the flange gasket 1.

Steel, aluminium, metal alloy or cast iron are preferably provided as the material for the metal reinforcing insert 9, 10.

The two rings 2, 3 are snap-connected together 19 in order to secure the rings 2, 3 to one another so as to be rotatable. An O-ring seal (not represented) can be accommodated between the two rings 2, 3.

What is claimed is:

1. A ring-shaped flange gasket produced from a rubbery-elastic material, said flange gasket comprising two rings, each having a ring-shaped reinforcing insert, said rings being formed in a wedge-shaped manner transversely relative to the ring axis and, at sides that face each other, adjoining one another at right angles to the ring axis by means of planar surfaces, wherein the planar surfaces are engaged with one another so as to be rotatable, wherein along at least one circumferential section, each of the ring-shaped reinforcing inserts has a plurality of waves that are defined by a wave profile, wherein the waves each have a wave crest, and wherein the wave crests increase in height in a region of increasing wedge height such that along the at least one circumferential section the height of each wave crest progressively increases in a direction defined by the increasing wedge height.

2. The flange gasket according to claim 1, wherein in the region of a wedge tip of the respective ring the reinforcing insert has a flatness, with respect to which the wave depth increases to maximum wave depth.

3. The flange gasket according to claim 2, wherein the flatness extends over a circumferential section of 80 to 100° with reference to the central point of the ring.

4. The flange gasket according to claim 1, wherein the wave profile extends symmetrically to a central cross-sectional plane of the ring.

5. The flange gasket according to claim 1, wherein the wave profile comprises a portion of longer wave length in the region of greater wedge height and a portion of shorter wave length in the region of smaller wedge height.

6. The flange gasket according to claim 1, wherein the wave profile is formed by harmonic waves.

7. The flange gasket according to claim 6, wherein the harmonic waves are spaced apart by flat pieces.

8. The flange gasket according to claim 6, wherein each wave crest of the harmonic waves faces an outer surface of the ring.

9. The flange gasket according to claim 1, wherein the wave crests of the wave profile are in a plane parallel to the outer surface of the respective ring.

10. The flange gasket according to claim 1, wherein flat pieces extend between wave crests of the wave profile, and wherein the flat pieces are in a plane parallel to the inner surface of the respective ring.

11. The flange gasket according to claim 1, wherein the metal reinforcing insert is produced from steel, aluminum, metal alloy or cast iron.

12. The flange gasket according to claim 1, wherein the two rings are snap-connected together.

* * * * *